Dec. 27, 1960 H. R. HOFMANN 2,966,556
DIAL TONE GATING CIRCUIT
Filed May 18, 1959
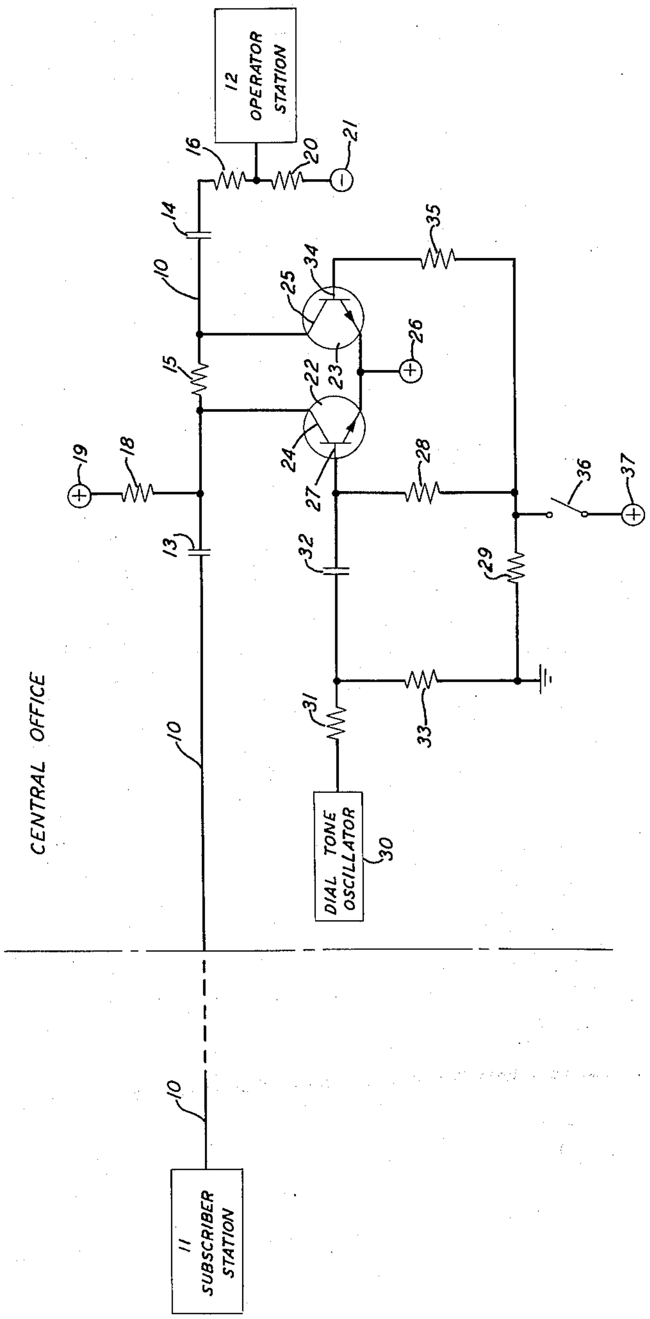
INVENTOR
H.R. HOFMANN
BY S.E. Hollander
ATTORNEY 2,966,556
Patented Dec. 27, 1960

2,966,556

DIAL TONE GATING CIRCUIT

Henry R. Hofmann, Morris Plains, N.J., assignor to Bell Telephone Laboratories, Incorporated, New York, N.Y., a corporation of New York Filed May 18, 1959, Ser. No. 813,797
6 Claims. (Cl. 179—84)

This invention pertains to telephone systems and more specifically to dial tone gating circuits for use therein.

In certain testing equipment utilized in telephone systems it is desirable to inform a calling subscriber that the operator or the equipment substituted therefor in the central office is in condition to accept and process a call. This may be accomplished by relaying a signal or dial tone of identifiable audio-frequency to the subscriber over the line or talking path from the central office when the operator comes on the line.

The circuitry utilized for relaying the dial tone is normally included as a portion of the central office equipment and may or may not be controllable by the operator. This circuitry is coupled to the line connecting the operator and the subscriber at a position therebetween. As the dial tone circuitry is actually a portion of the central office equipment, it is physically closer on the talking path to the operator than to the subscriber to whom the dial tone signal must be sent. For instance, the subscriber may be at a distance of ten miles from the central office in which both the operator and the dial tone circuitry are located. Since the distance separating a transmitting station and a receiving station on a line has a direct effect on the amount a signal is attenuated, a much stronger signal must be provided by the dial tone circuitry for the subscriber than the proximate operator's receiver equipment is capable of handling without overloading. It is therefore desirable to provide a means for attenuating the dial tone signal in the operator's direction on the line while amplifying the same signal in the subscriber's direction.

An identical problem arises in any telephone system involving an operator when the operator places a ringing tone on a talking path to solicit an answer from a called subscriber. In this situation overloading of the operator's receiving equipment may occur, and it is again desirable to provide a means for attenuating the signal in the operator's direction on the line while amplifying the same signal in the subscriber's direction.

Further, it is desirable that such signaling or dial tone circuitry is adaptable to use in a modern telephone system wherein a single talking path connects the operator to any subscriber.

Heretofore, the foregoing amplification and attenuation in opposing directions on a line have been accomplished by various complicated and expensive means such as by interposing auxiliary apparatus in the talking path for providing the dial tone signal and physically terminating each branch of the path thereat. A circuit of this type has an obvious deleterious effect on the talking path in the "off" condition of the dial tone circuitry simply by its presence in the path. It is desirable that any tone gating equipment have as little effect as possible on the talking path when not in use.

Additionally, as is always true in telephone systems where great numbers of identical circuits are required, structural compactness and simplicity, and component and overall inexpensiveness are especially desirable.

It is therefore an object of this invention to improve signaling-tone gating in a telephone system.

Another object of this invention is to reduce the cost of tone gating in a telephone system.

Another object of this invention is to simplify tone gating circuits utilized with talking paths by providing for amplification of a signal in a first direction on the path and attenuation in the opposite direction thereon without physical termination of the talking path at the gating circuit.

A more specific object of this invention in one embodiment is to provide a simplified dial tone gating circuit for connection to a talking path comprising a single line which gating circuit coincidentally amplifies a signal applied thereto for transfer to a first output and attenuates that signal as applied to another output.

Another object of this invention is to minimize the effect of a tone gating circuit on the talking path to which it is connected in the disabled state of the gating circuit.

Briefly, these objects are accomplished in accordance with aspects of this invention by a gating circuit in the central office equipment of a telephone system which circuit comprises two transistors connected in shunt; the transistors have their collectors connected to a talking path. The transistors are so biased that they are normally nonconducting and have no effect on signals passing between the subscriber and the operator. However, upon keying, i.e., connecting a single source to apply potential to the base of each transistor, a first one of the transistors operates to amplify and apply a tone signal supplied at its base to the talking path; the second transistor coincidentally operates to ground substantially all of any signal normally passing to the operator's equipment via the talking path during the period of tone amplification. However, the gate advantageously does allow reception by the operator of a small portion of the tone signal to provide a check on the proper functioning of the tone oscillating and gating equipment. Thus, this circuit provides an amplified signal to a physically remote subscriber while attenuating the same signal as applied to the proximate operator's equipment to preclude overloading thereof.

It is a feature of this invention that a dial tone gate comprises two identical shunt-associated transistors connected to a talking path by their collectors.

Another feature of this invention resides in the biasing means whereby a single applied control signal causes a first transistor to amplify an information signal applied thereto and apply that amplified signal to an output path and a second transistor coincidentally to provide a path to ground to short out a second output path.

An additional feature of this invention relates to the means of connecting the gate to the talking path whereby the gate has substantially no effect on the talking path in the off state of the gate.

These and other objects and features of this invention will be better understood upon consideration of the following detailed description and the accompanying drawing, the single figure of which depicts a schematic representation of one illustrative embodiment of the invention especially useful as a dial tone gate.

Referring to the drawing there is shown a talking path 10 connecting a subscriber station 11 with an operator station 12. The subscriber station 11, the operator station 12, and the talking path or line 10 are of types well known in the art and, though the subscriber station 11 and the operator station 12 are shown directly connected by the path 10, various switching systems are normally interposed therebetween which may illustratively take the form of those disclosed in Patent No. 2,585,904, of A. J. Busch, issued February 19, 1952. The path 10 comprises a portion actually connected to the remote subscriber station 11 and a central office portion. Interposed in the path 10 within the central office portion are a first capacitor 13, a second capacitor 14, a first resistor 15 and a second resistor 16. The capacitors 13 and 14 are furnished to provide direct-current isolation for the dial tone testing circuitry, to be explained hereinafter, which is interposed therebetween. A resistor 18 connected to a source of positive potential 19 and to the path 10, and a resistor 20 connected to a source of negative potential 21 and to the path 10, provide the direct-current potentials required at the various portions of the path 10 for proper operation of the equipment joined thereto.

Connected to the line 10 by their collectors 24 and 25, respectively, are a first NPN transistor 22 and a second NPN transistor 23. Separating the collectors 24 and 25 in the line 10 is the resistor 15. A source of positive potential 26 is connected to bias the transistors 22 and 23. The source 26 is adapted to furnish a lesser positive potential than the source 19. The base 27 of the transistor 22 is connected to ground through a resistor 28 and a resistor 29. An input is provided to the base 27 of the transistor 22 from a dial tone oscillator 30 through a resistor 31 and a capacitor 32. A resistor 33 connects the capacitor 32 to ground. Though a signal is furnished to the base 27 of the transistor 22, the ground potential furnished at the base 27 provides that the transistor 22 is normally "off" and no conduction takes place.

The transistor 23 has its base 34 connected to ground through a resistor 35 and the resistor 29 and therefore is also normally biased "off" or nonconducting. With both of the transistors 22 and 23 normally "off," signals are passed from the subscriber station 11 to the operator station 12 with only the slight attenuation provided by the resistors 15 and 16. An especially advantageous feature of the gate circuit of the present invention is that it offers no appreciable interference to the talking path in the "off" condition and is thus useful in line circuits, such as talking paths, where signal attenuation is a problem.

When, on the other hand, it is desired to signal the subscriber station 11 that the central office is ready to handle his call, i.e., give the subscriber a dial tone, a switch 36 connected between the resistors 28, 29, and 35 is closed. Closing the switch 36 applies a positive potential from a source 37 to the bases 27 and 34 of the transistors 22 and 23. The positive potential from the source 37 and the resistors 28 and 35 are advantageously such as to bias the transistor 22 in a condition to amplify signals applied at its base 27, such as the dial tone signals furnished by the dial tone oscillator 30, and, further, to bias the transistor 23 in a saturated condition. It is to be noted that this novel biasing is facilitated by the resistor 15 which advantageously provides a voltage drop to place the collector 25 at a lower voltage than the collector 24 thereby allowing the transistor 23 to saturate while the transistor 22 amplifies.

With the potential furnished by the source 37 applied at its base 27, the transistor 22 amplifies the dial tone signals from source 30 and applies these amplified signals to the line 10 where they are transferred to the subscriber station 11 through the coupling capacitor 13. Transfer of the amplified signals to the operator station 12 is substantially prevented by the saturation of the transistor 23 which provides a low impedance path to ground through a path including the transistor 23 and the source 26. In this respect it is to be assumed that wherever a source of potential is shown in the drawing as positive or negative, the other terminal thereof is connected to ground. The very small drop occasioned across the transistor 23 in the saturated condition thereof provides a slight dial tone signal to the operator station 12 whereby a check of the operation of the dial tone oscillator 30 may be made.

In one specific embodiment of the present invention which may be utilized for dial tone gating in central office testing equipment, the elements may have the following illustrative values:

| | |
|---|---|
| Transistor 22 | Sylvania 2N94. |
| Transistor 23 | Sylvania 2N94. |
| Resistor 15 | 1,100Ω. |
| Resistor 16 | 5,000Ω. |
| Resistor 18 | 470Ω. |
| Resistor 20 | 20,000Ω. |
| Resistor 28 | 20,000Ω. |
| Resistor 29 | 2,000Ω. |
| Resistor 31 | 22,000Ω. |
| Resistor 33 | 3,000Ω. |
| Resistor 35 | 51,000Ω. |
| Capacitor 13 | 4 μf. |
| Capacitor 14 | 0.2 μf. |
| Capacitor 32 | 0.25 μf. |
| Source 19 | 22 volts. |
| Source 21 | —16 volts. |
| Source 26 | 7.5 volts. |
| Source 37 | 16 volts. |

As may be seen the circuit of this invention includes very few, inexpensive, component parts.

It is apparent that various changes in the circuit of the figure might be effectuated. For instance PNP transistors might be utilized in place of the NPN transistors disclosed with only slight changes in the circuitry. Further, the switch 36 might be made to operate in any well-known manner, as for example, in response to a signal actuated relay. The circuit may obviously be utilized in most gating situations wherein it is desirable to amplify a signal to a first output while attenuating the same signal to a second output. It is to be understood that the complete disclosure of the circuit as a dial tone gate in the specific embodiment utilized for testing is not to preclude its use as a ringing tone gate.

It is to be understood that the above-described arrangement is merely illustrative of the application of the principles of this invention. Numerous other arrangements may be devised by those skilled in the art without departing from the spirit and scope of the invention.

What is claimed is:

1. A circuit for use in a telephone system capable of amplifying a signal in a first direction on a talking path and attenuating the signal in the opposite direction thereon without affecting the continuity of said path comprising in combination with said talking path an amplifying means connected to said path, a source of input signals connected to said amplifying means, a source of reference potential bistable switching means connected to said path for connecting said path to said source of reference potential, impedance means in said path intermediate between and connecting in parallel said amplifying means and said switching means, and means biasing said amplifying means and said switching means to maintain said two means respectively amplifying and connected.

2. A circuit for use in a telephone system capable of amplifying a signal in a first direction on a talking path and attenuating the signal in the opposite direction thereon without affecting the continuity of said path comprising in combination with said talking path an amplifying means connected to said path, a source of input signals connected to said amplifying means, a source of reference potential, bistable switching means connected to said path for connecting said path to said source of reference potential, impedance means in said path intermediate between and connecting in parallel said amplifying means and said switching means, means biasing said amplifying means and said switching means to maintain said two means respectively amplifying and connected, and wherein said amplifying means and said bistable switching means comprise identical transistors, and said biasing means comprises a switch connected to said transistors and a source of potential connected to said switch.

3. A circuit for introducing a signal to a talking path comprising in combination a subscriber station; a control station; a talking path connecting said subscriber station to said control station including an impedance connected in said talking path; a first transistor connected to said talking path between said subscriber station and said impedance; a source of signals connected to said first transistor; biasing means connected to said first transistor for placing said first transistor in an amplifying condition; a second transistor connected to said talking path between said control station and said impedance; a source of reference potential connected to said second transistor; and biasing means connected to said second transistor for operating said second transistor in a saturated condition.

4. A circuit as in claim 3 wherein said biasing means connected to sad first transistor includes a resistor, a switch connected to said resistor, and a source of input potential connected to said switch; and said biasing means connected to said second transistor comprises a second resistor connecting said second transistor and said switch.

5. A circuit for introducing a signal to a talking path comprising in combination a subscriber station; a control station; a talking path connecting said subscriber station to said control station including a first resistor connected therein; a first transistor having a base, an emitter, and a collector, said collector connected to said talking path between said subscriber station and said first resistor; a source of input signals connected to said base of said first transistor; a first source of reference potential connected to said base of said first transistor; a second source of reference potential connected to said collector of said first transistor; a third source of reference potential connected to said emitter of said first transistor such as to maintain said first transistor normally nonconducting; a second transistor having a collector connected to said talking path between said control station and said first resistor, a base connected to said first source of reference potential, and an emitter connected to said third source of reference potential such as to maintain said second transistor normally nonconducting; a fourth source of reference potential; and switching means connected to said fourth source and said bases of each of said transistors to coincidentally operate said first transistor in an amplifying condition and said second transistor in a saturated condition.

6. An electrical circuit comprising a first and a second station, a talking path connecting said stations, and means for applying a signal along said path to said first station substantially to the exclusion of said second station, said means including means direct current isolating a portion of said talking path, a first source of potential connected to said path portion, a first and a second transistor each having a first electrode connected to said path portion, means applying a reference potential to a second electrode of each of said transistors, means connected to a third electrode of each of said transistors normally maintaining said transistors nonconducting, means applying said signal to said third electrode of said first transistor, switch means for applying a potential to said third electrodes of said first and second transistors to cause said transistors to conduct, and means for causing said second transistor to saturate on conduction to prevent said signal being applied to said second station while said first transistor amplifies said signal and applies it to said first station, said last-mentioned means including a resistance in said path portion between said first and second transistor first electrodes, said first potential being connected to said path portion adjacent said first transistor first electrode.

References Cited in the file of this patent

UNITED STATES PATENTS

| | | |
|---|---|---|
| 1,371,298 | Clark | May 15, 1921 |
| 1,463,200 | Davidson | July 31, 1923 |